July 25, 1967     A. T. SHEPHERD ET AL     3,333,257
MEASURING APPARATUS FOR DRIVING A SYNCHRONOUS MOTOR IN
RESPONSE TO THE MOVEMENT OF A CYCLIC WAVE PATTERN
Original Filed Aug. 28, 1961

INVENTORS
ALEXANDER T. SHEPHERD
LOCKHART TAYLOR
DONALD F. WALKER
BY
Cameron, Kerkam & Sutton
ATTORNEYS United States Patent Office 3,333,257
Patented July 25, 1967

3,333,257
MEASURING APPARATUS FOR DRIVING A SYNCHRONOUS MOTOR IN RESPONSE TO THE MOVEMENT OF A CYCLIC WAVE PATTERN
Alexander Turnbull Shepherd, and Lockhart Taylor, Edinburgh, and Donald Ferguson Walker, Barnton Midlothian, Scotland, assignors to Ferranti Limited, Hollingwood, England, a company of Great Britain and Northern Ireland
Continuation of abandoned application Ser. No. 134,333, Aug. 28, 1961. This application Aug. 31, 1964, Ser. No. 393,053
Claims priority, application Great Britain, Sept. 1, 1960, 30,110/60
4 Claims. (Cl. 340—203)

ABSTRACT OF THE DISCLOSURE

Measuring apparatus for determining the extent and sense of relative movement of a first object in one or other of two opposite directions including three photocells arranged to drive a synchronous motor in response to the movement of a cyclic wave pattern.

The synchronous motor is driven by a stabilizing circuit and a phase-splitting circuit. The phase-splitting circuit eliminates direct-current components from the stator windings of the motor which is capable of working down to zero frequency.

This is a continuation of application Ser. No. 134,333, filed Aug. 28, 1961, now abandoned.

BACKGROUND OF THE INVENTION

1. Field of the invention

This invention relates to measuring apparatus for determining the extent and sense of the movement of a first object in one or other of two opposite directions with respect to a second object, and is a modification of the invention—hereinafter referred to as the parent invention—disclosed in U.S. Patent No. 2,886,717, corresponding to British patent specification No. 760,321.

2. Description of the prior art

In U.S. Patent No. 2,886,717 there is disclosed measuring apparatus for determining the extent and sense of the relative movement of a first object in one or other of two opposite directions with respect to a second object including means for setting up a cyclic wave pattern adapted to move with respect to said second object in dependence on the said relative movement of said first object, two detecting devices adapted during the said movement of the pattern to respond electrically to the conditions of the patern at two positions fixed with respect to the second object where said conditions are out of phase with one another by a fraction of half the cyclic wavelength of the pattern, and electrical stages for determining the sense of the said relative movement of said object from the relative phase of the electrical output signals from said detecting devices and for determining the extent of said movement from the number of cycles of said output signals which occur during said movement.

In accordance with the invention disclosed in U.S. Patent No. 2,886,718, corresponding to British patent specification No. 810,478, which is also a modification of the invention disclosed in U.S. Patent No. 2,886,717, the said detecting devices of the invention were increased to four for the purpose of rendering unnecessary the stabilisation of such factors as the values of the supply voltages any shifts of which would otherwise affect the accuracy of the apparatus.

An object of the present invention is to provide measuring apparatus for the purpose stated in which the stabilisation of such factors is rendered unnecessary by the use of only three detecting devices.

SUMMARY OF THE INVENTION

In accordance with the present invention measuring apparatus for determining the extent and sense of the relative movement of a first object in one or other of two opposite directions with respect to a second object includes means for setting up a cyclic wave pattern arranged to move with respect to the second object in dependence on the said relative movement of the first object, three detecting devices arranged to respond electrically to the conditions of the pattern at three positions fixed with respect to the second object where those conditions are 120 degrees out of phase with one another, a stabilising stage for stabilising the electrical output signals from the detecting devices against in-phase changes of those signals, and a three-phase synchronous motor energised by the stabilised signals for representing by the extent and direction of the angular displacement of the motor rotor from a datum angular position the extent and direction of the said relative movement of the first object.

The invention will now be described by way of example as a modification of the invention first described with reference to FIGURES 1 and 2 of U.S. Patent No. 2,886,717, the first object being assumed to be the worktable of a machine tool and the second object the framework of the tool.

BRIEF DESCRIPTION OF THE DRAWINGS

In the accompanying drawings:
FIGURE 1 is a schematic circuit diagram of one embodiment of the invention, and
FIGURES 2 and 3 are circuit diagrams of stages shown generally in FIGURE 1.

DESCRIPTION OF THE PREFERRED EMBODIMENT

In FIGURE 1 the cyclic wave pattern, assumed to be an optical pattern, is represented at 200. This is arranged to move with the worktable (not shown) past three positions 201 to 203 which are fixed with respect to the framework of the tool. The conditions of the pattern at these three positions are 120° out of phase with one another. To respond electrically to these conditions of the pattern respectively there are provided three detecting devices 211 to 213, assumed to be photocells, which are also fixed with respect to the framework. Because of the phase relationship above mentioned, the output signals from the detecting devices as the pattern moves past them are in balanced three-phase form.

These signals are applied as input to a stabilising stage 205, described in detail later with reference to FIGURE 2, which stabilises the signals against in-phase disturbances of them in a manner to be described. The three-phase output signals from stabiliser 205 are applied over leads P, Q, and R to the inputs of a power amplifier stage 230. To ensure stabilisation the stage is similar to stage 205 and so need not be depicted in detail. The three-phase output from the amplifier is applied by way of leads $P^1$, $Q^1$, and $R^1$ and phase-splitter stages 231 to 233 respectively to drive the three-phase stator windings 235 to 237 respectively of the motor 240. The rotor 241, which is of the permanent-magnet two-pole kind usual with such motors, is coupled to some sort of device 242 responsive to the extent and direction of the rotation of the rotor. The device 242 may take the form of a reversible revolution-counter or a pen driven by the rotor in one or other direction across a moving chart.

In response to the movement of the pattern the motor rotor 241 rotates, representing by the exent and direction of its angular movement from some datum position the extent and direction of the movement of the worktable.

Stabilising stage 205 may take the form shown in FIGURE 2. For each of the three phases there is provided an amplifier triode valve 206, 207, or 208, as the case may be. The cathodes of the valves are connected to earth through a resistor 215 common to all three of the valve input circuits. The anodes of the valves are connected to a source of positive potential through load resistors 216 to 218 respectively and to amplifier stage 230 by way of leads P, Q, and R above mentioned. Detecting devices 211 to 213 are connected to the respective grids of the valves.

The stabilising action of stage 205 results from the use of the common cathode resistor 215 and the well-known fact that in a balanced three-phase system the sum of the respective phase currents at any given moment is zero. Thus the current through resistor 215 is a steady direct current as determined by the valve circuit parameters, there being no feedback voltage at signal frequency developed across it.

Whenever there is any in-phase disturbance of the input signals—that is, whenever any two, or all three, change simultaneously in the same sense, due to, say, a decrease in the value of the supply voltage—the current through resistor 215 changes correspondingly in the sense to maintain the respective grid/cathode voltages substantially constant. Such changes of signal therefore do not appear in leads P, Q, and R.

The stabilisation of the signals in this manner against in-phase disturbances renders unnecesary the much more elaborate and costly procedure of stabilising individually all the possible origins of such disturbances, such as the supply voltages, or, where the pattern is an optical pattern, the brightness of the light which illuminates the pattern or the response characteristics of the photocells.

It will be seen that stage 205 is direct-current coupled; as explained in U.S. Patent No. 2,886,718, such a coupling is required to enable the apparatus to maintain a response condition appropriate to the position reached by the worktable whenever it ceases to move, thereby enabling the apparatus to resume its correct functioning as soon as the table starts to move again.

The phase-splitter stages 231, 232 and 233 are used because it is desirable to eliminate direct-current components from the stator windings 235, 236 and 237 of motor 240 in order to ensure that the motor operates smoothly down to low speeds. A suitable form for such a stage, taking stage 231 as an example, is shown in FIGURE 3. The stage includes two triode valves 243 and 244 sharing a common cathode load 245 and having separate anode load resistors 246 and 247. Lead P¹ is connected to the control grid of valve 243, the grid of valve 244 being earthed through a resistor 248. The two parts of winding 235 are connected in series between the anodes of the valves. The stage operates in known manner to apply to the windings an alternating push-pull voltage about a mean value which occurs when the valves are equally energised and hence is zero.

The lag of synchronous motor 240 should be limited to a low angle, say about 10 degrees, and the motor should be capable of working down to zero frequency. To give a sufficiently uniform rotation at such low speeds the pole slots in the stator laminations should be skewed, or the stator poles should be unslotted, and the currents which energise the stator windings should have the direct-current components eliminated.

The pattern may be an optical pattern set up by illuminated skewed gratings such as, for example, described in Patent No. 2,886,717. Owing to the skewed relationship of the gratings shown therein, with reference to FIGS. 1 and 2 of that patent, there is produced a cyclic coincidence pattern of alternate opacities and transparencies. The pattern moves in a direction normal to the direction of movement of one grating, which moves relative to the other grating. The relative phase of the parts of the patterns 201 and 203 seen by the three detecting devices 211 to 213, now photocells, may be adjusted by rotating one grating with respect to the other to obtain the required 120° relationship.

As can be readily appreciated, a pattern, as the term is understood, denotes a spatial relationship depicted by plotting some characteristics such as light intensity against distance from a datum position. Since a pattern must fully exist at any given moment, the optical pattern set up by the gratings is a cyclic wave spatial pattern having a spatial wavelength between maximum intensities as more fully described in the aforesaid U.S. Patent No. 2,886,717.

The present invention is applicable not only where the pattern is of the optical kind but also where the pattern is of the recorded magnetic kind described in U.S. Patent No. 2,886,717.

What we claim is:

1. Measuring apparatus for determining the extent and sense of the relative movement of a first object in one or other of two opposite directions with respect to a second object including means for setting up a cyclic wave pattern having a spatial wavelength between maximum intensities adapted to move with respect to the second object in dependence on the said relative movement of the first object and wherein the conditions of the pattern at three positions along said wavelength fixed with respect to said second object are 120 degrees out of phase with one another, three detecting means operative to produce electrical output signals responsive to and indicative of the conditions of the pattern, one detecting means being positioned at each of said three positions, a stabilising means for stabilising the electrical output signals from said detecting devices against in-phase changes of those signals, a three-phase synchronous motor having a permanent magnet rotor and a plurality of stator windings and being of the type in which the angular position of the rotor is determined by the relative conditions of energisation of said stator windings and capable of working down to zero frequency, means for energising said three stator windings from the electrical output signals of the three detecting means respectively by way of the stabilising means such that the angular position of the rotor represents by the extent and direction of its displacement from a datum angular position the extent and direction of the said relative movement of the first object, and indicator means coupled to the rotor for indicating such movement.

2. Apparatus as claimed in claim 1 wherein said stabilising means includes three amplifier means each having an input circuit arranged to receive the electrical output from one of the detecting means and an impedance common to all three input circuits.

3. Apparatus as set forth in claim 1 wherein said cyclic wave pattern is an optical pattern and each of said three detecting means is a photocell.

4. Measuring apparatus as set forth in claim 3 wherein said stabilising means includes three amplifier means each having an input circuit arranged to receive the electrical output from one of the photocells and an impedance common to all three input circuits, and said means for energizing said stator windings from the electrical output signals of the three detecting means respectively by way of the stabilising means includes three phase splitter circuits each having an input circuit arranged to receive the electrical output from one of the stabilising stages and an output connected to one winding of the synchronous motor to apply to said winding an alternating push-pull voltage about a mean value.

(References on following page)

References Cited

UNITED STATES PATENTS

| | | | |
|---|---|---|---|
| 2,418,193 | 4/1947 | Peterson | 340—198 |
| 2,546,628 | 3/1951 | Briggs | 340—198 |
| 2,669,628 | 2/1954 | Pfunther | 340—198 |

FOREIGN PATENTS 702,102  1/1941  Germany.

NEIL C. READ, *Primary Examiner.*

THOMAS B. HABECKER, *Examiner.*